US010025827B1

(12) United States Patent
Fawcett

(10) Patent No.: US 10,025,827 B1
(45) Date of Patent: *Jul. 17, 2018

(54) OPERATOR FUSION MANAGEMENT IN A STREAM COMPUTING ENVIRONMENT

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/705,625

(22) Filed: Sep. 15, 2017

Related U.S. Application Data

(63) Continuation of application No. 15/408,416, filed on Jan. 17, 2017.

(51) Int. Cl.
G06F 17/30 (2006.01)
G06F 9/50 (2006.01)

(52) U.S. Cl.
CPC ...... G06F 17/30516 (2013.01); G06F 9/5027 (2013.01)

(58) Field of Classification Search
None
See application file for complete search history.

(56) References Cited

U.S. PATENT DOCUMENTS

| 8,239,534 | B1 | 8/2012 | Fall et al. |
| 8,327,337 | B2 | 12/2012 | Barsness et al. |
| 8,407,360 | B2 | 3/2013 | Andrade et al. |
| 8,898,505 | B2 | 11/2014 | Fawcett |
| 8,990,827 | B2 | 3/2015 | Wu et al. |
| 9,183,107 | B2 | 11/2015 | Branson et al. |
| 9,218,395 | B2 | 12/2015 | Barsness et al. |
| 9,298,485 | B2 | 3/2016 | Bragstad et al. |
| 9,342,385 | B2 | 5/2016 | Branson et al. |
| 9,614,740 | B2 | 4/2017 | Branson et al. |

(Continued)

FOREIGN PATENT DOCUMENTS

WO 2016107488 A1 7/2016

OTHER PUBLICATIONS

Repantis et al; QoS-Aware Shared Component Composition for Distributed Stream Processing Systems; IEEE Transactions on Parallel and Distributed Systems vol. 20, No. 7, Jul. 2009.*

(Continued)

Primary Examiner — Bing Zhao
(74) Attorney, Agent, or Firm — Michael A. Petrocelli

(57) ABSTRACT

Disclosed aspects relate to managing a set of development data for operator fusion management in a stream computing environment having a plurality of stream operators. A set of operator attributes of the plurality of stream operators may be collected by an operator fusion management engine in the stream computing environment. A set of candidate operator fusion management operations may be determined with respect to the plurality of stream operators. The set of candidate operator fusion management operations may be determined by the operator fusion management engine based on the set of operator attributes. At least one of the set of candidate operator fusion management operations may be performed in the stream computing environment with respect to the plurality of stream operators.

1 Claim, 11 Drawing Sheets

(56) References Cited

U.S. PATENT DOCUMENTS

| | | | |
|---|---|---|---|
| 2012/0297391 A1* | 11/2012 | Andrade | G06F 9/5011 718/102 |
| 2015/0334143 A1 | 11/2015 | Branson et al. | |
| 2016/0092345 A1 | 3/2016 | Branson et al. | |
| 2016/0378566 A1 | 12/2016 | Barsness et al. | |

OTHER PUBLICATIONS

Cheng et al.; "Prioritized Security Attributes Allocation and Usage Based on the Characteristics of Data Transfer"; Motorola; IP.com; Jan. 8, 2009.

Disclosed Anonymously; "Fine-Grained Selection of Streaming Application Sub-Graphs for Different Levels of Data Processing Guarantee"; IP.com; Mar. 7, 2016.

International Business Machines Corporation; "IBM InfoSphere Streams Version 4.1.1: Operators: spl 1.2.1"; ibm.com/support/knowledgecenter/SSCRJU_4.1.1/com.ibm.streams.toolkits.doc/spldoc/dita/tk$spl/ix$Operator.html>.

Hirzel et al. (2014). A catalog of stream processing optimizations. ACM Computing Surveys (CSUR), 46(4), 46.

Jain et al. (Jun. 2004). Adaptive stream resource management using kalman filters. In Proceedings of the 2004 ACM SIGMOD international conference on Management of data. pp. 11-22.

International Business Machines Corporation; IBM Streams Version 4.2 related article entitled "What's New in Streams V4.2"; developer.ibm.com/streamsdev/2016/09/23/whats-new-in-streams-v4-2/>; Sep. 23, 2016.

Pending U.S. Appl. No. 15/408,416, filed Jan. 17, 2017, entitled: "Operator Fusion Management in a Stream Computing Environment", pp. 1-74.

IBM: List of IBM Patents or Patent Applications Treated as Related (Appendix P), Oct. 3, 2017, pp. 1-2.

* cited by examiner

OPERATOR FUSION MANAGEMENT IN A STREAM COMPUTING ENVIRONMENT

STATEMENT REGARDING PRIOR DISCLOSURES BY THE INVENTOR OR A JOINT INVENTOR

The following disclosure(s) are submitted under 35 U.S.C. 102(b)(1)(A): IBM Streams Version 4.2, Sep. 23, 2016.

BACKGROUND

This disclosure relates generally to computer systems and, more particularly, relates to operator fusion management in a stream computing environment. Management of operator fusions may be desired to be performed as efficiently as possible. As the number of operator fusions needed to be managed increases, the need for operator fusion management in a stream computing environment may increase.

SUMMARY

Aspects of the disclosure relate to operator fusion management in a stream computing environment having a plurality of stream operators. Aspects of the disclosure relate to constraint checking to control fusion characteristics of stream operators. High-level fusion constraints may be examined and compared for a set of stream operators to evaluate a plurality of candidate fusion operations. For instance, a set of stream operators may be examined with respect to high level constraints including segregated location constraints, provisional location constraints, soft partition co-locate constraints, or the like. Aspects of the disclosure relate to user-directed fusion for processing user-specified constraints for a set of operators that should be fused together as a single processing unit as well as heuristic-directed fusion for generating fusion configurations to achieve particular fusion objectives.

Disclosed aspects relate to operator fusion management in a stream computing environment having a plurality of stream operators. A set of operator attributes of the plurality of stream operators may be collected by an operator fusion management engine in the stream computing environment. A set of candidate operator fusion management operations may be determined with respect to the plurality of stream operators. The set of candidate operator fusion management operations may be determined by the operator fusion management engine based on the set of operator attributes. At least one of the set of candidate operator fusion management operations may be performed in the stream computing environment with respect to the plurality of stream operators.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
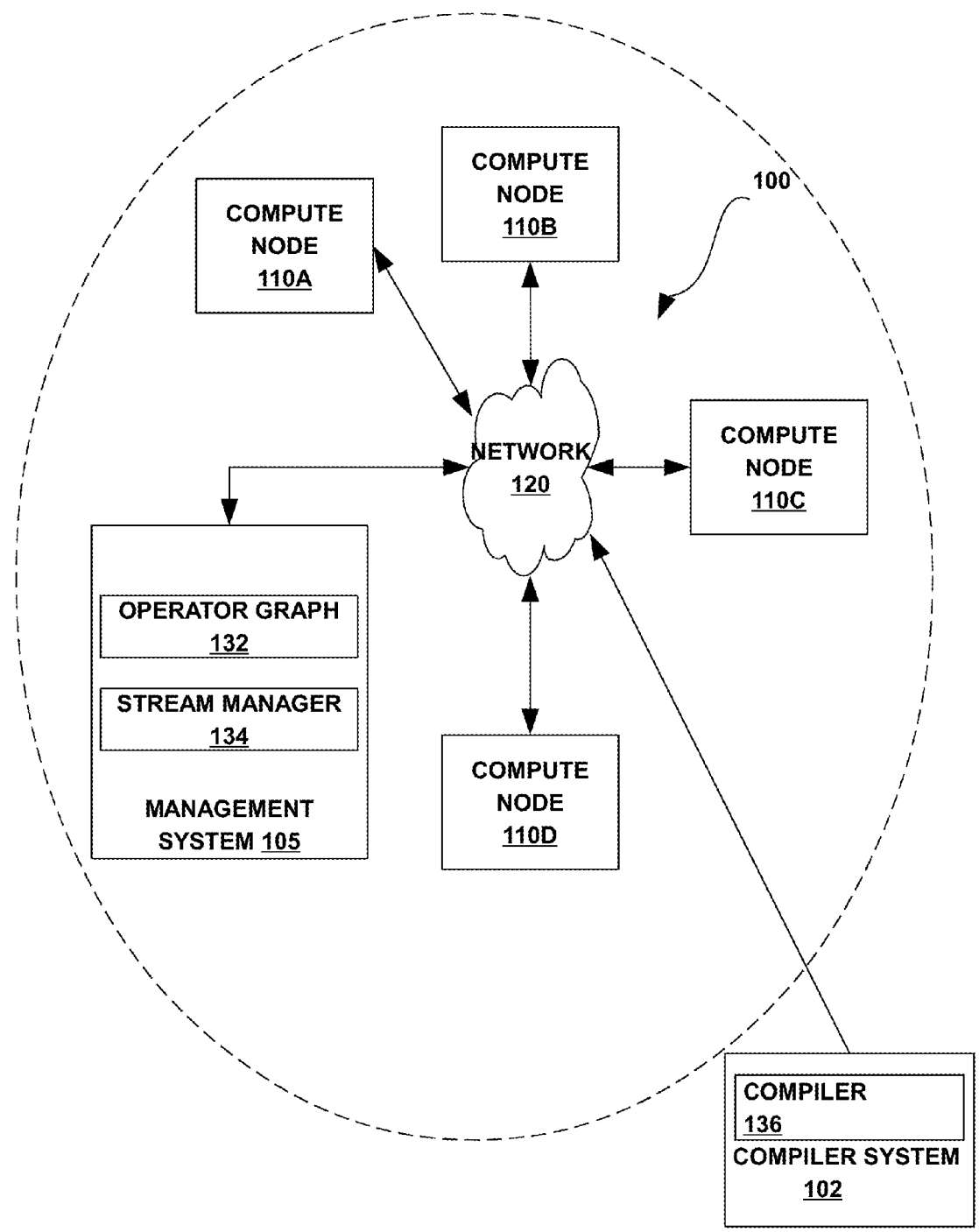
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to operator fusion management in a stream computing environment having a plurality of stream operators. Aspects of the disclosure relate to constraint checking to control fusion characteristics of stream operators. High-level fusion constraints may be examined and compared for a set of stream operators to evaluate a plurality of candidate fusion operations. For instance, a set of stream operators may be examined with respect to high level constraints including segregated location constraints (e.g., operators may only be fused together with other operators in the same region), provisional location constraints (e.g., operators may fuse with operators from the same region and operators outside the region, but not with operators in a different region), soft partition co-locate constraints (e.g., multiple operators may be fused together with user-directed constraints, but non-user directed fusion cannot fuse that operator anymore) or the like. Aspects of the disclosure relate to user-directed fusion for processing user-specified constraints for a set of operators that should be fused together as a single processing unit (e.g., "hard" constraints) as well as heuristic-directed fusion for generating fusion configurations to achieve particular fusion objectives (e.g., target processing element numbers). Leveraging management of high-level fusion constraints with respect to a plurality of stream operators may be associated with data processing efficiency and stream application performance.

Stream operators may be associated with a variety of constraints that influence how and with which other stream operators they may be fused. Aspects of the disclosure relate to the recognition that, in some situations, operator fusion constraint checks may not scale in accordance with evolving constraint sets to support high-level constructs (e.g., providing pair-wise compare based messages rather than group-directed messages). Accordingly, aspects of the disclosure relate to managing high-level operator fusion constraints (e.g., segregated location constraints, provisional location constraints, soft partition co-locate constraints) to facilitate stream application efficiency and performance. As such, a higher degree of fusion constraint control may be provided to facilitate management of constraint violations and operator fusion operations.

Aspects of the disclosure relate to a system, method, and computer program product for operator fusion management in a stream computing environment having a plurality of stream operators. A set of operator attributes of the plurality of stream operators may be collected by an operator fusion management engine in the stream computing environment. A set of candidate operator fusion management operations may be determined with respect to the plurality of stream operators. The set of candidate operator fusion management operations may be determined by the operator fusion management engine based on the set of operator attributes. At least one of the set of candidate operator fusion management operations may be performed in the stream computing environment with respect to the plurality of stream operators.

Aspects of the disclosure relate prescribing a user-directed fusion of the plurality of stream operators, and proscribing a non-user-directed fusion of the plurality of stream operators. In embodiments, the set of candidate operator fusion management operations with respect to the plurality of stream operators may be determined using a segregated location criterion pertaining to a region of stream operators. In embodiments, the set of candidate operator fusion management operations with respect to the plurality of stream operators may be determined using a provisional location criterion pertaining to a region of stream operators. In embodiments, the set of candidate operator fusion management operations with respect to the plurality of stream operators may be determined using a soft-partition co-locate criterion pertaining to a region of stream operators. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A —110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
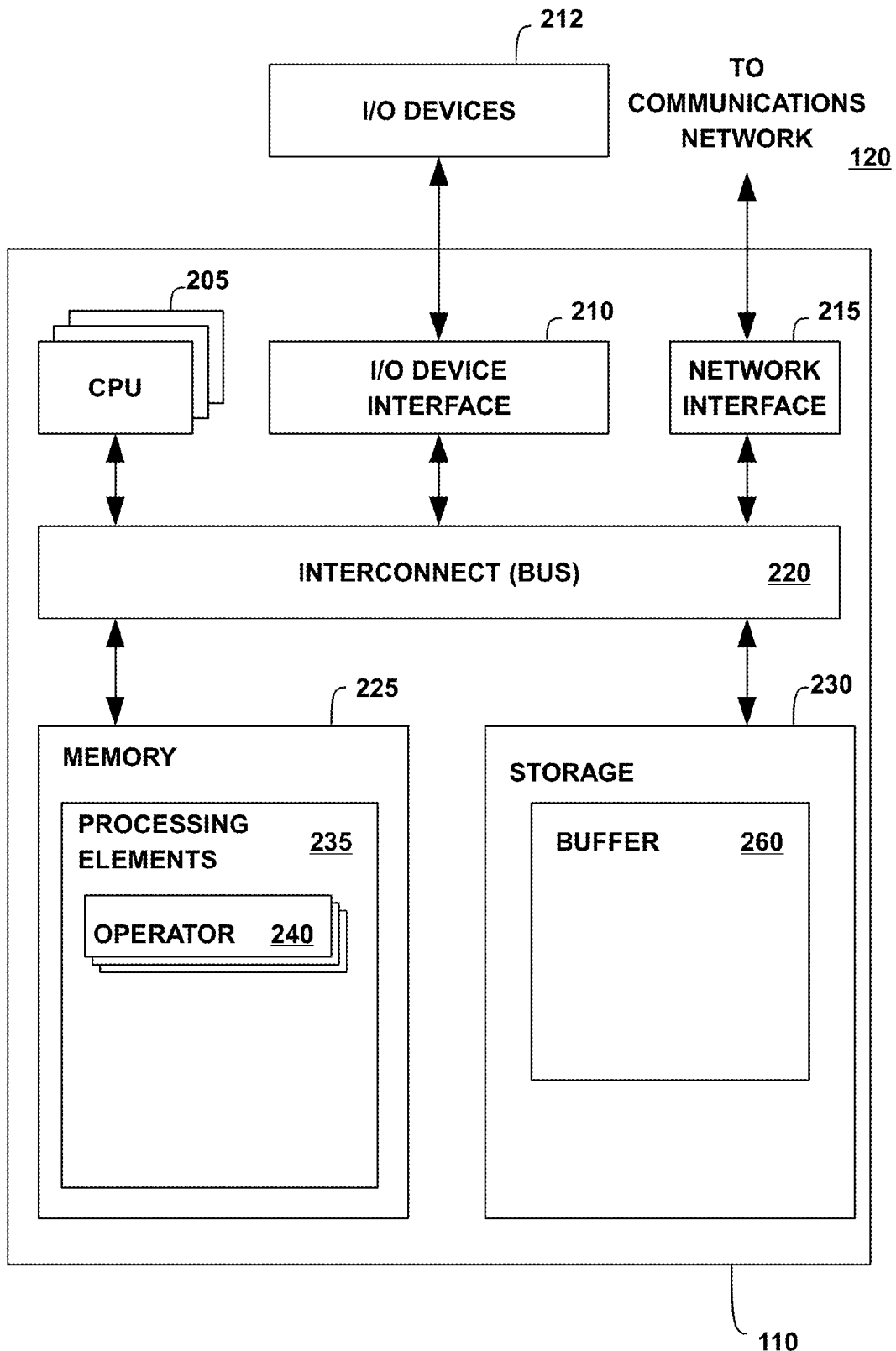
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
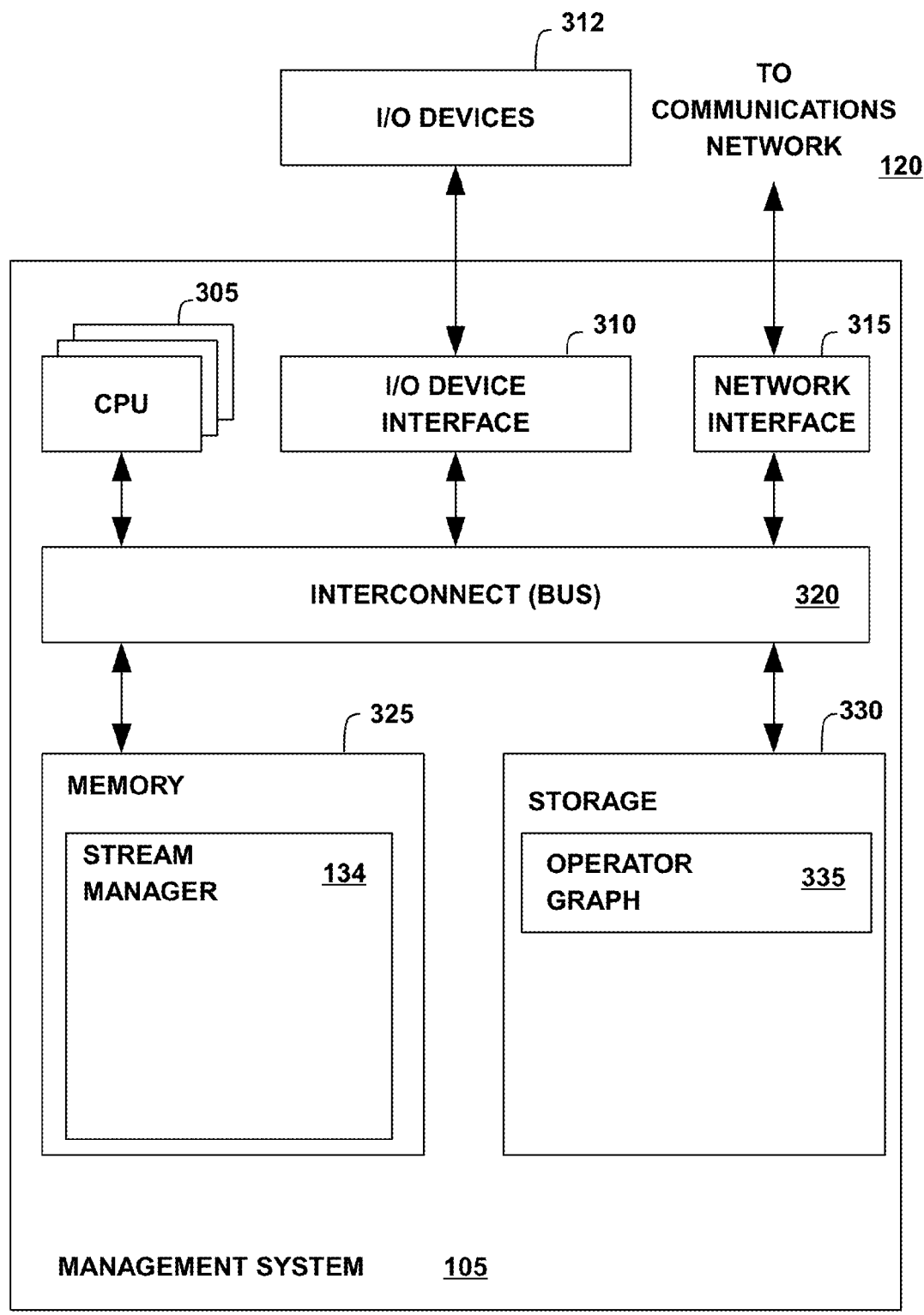
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
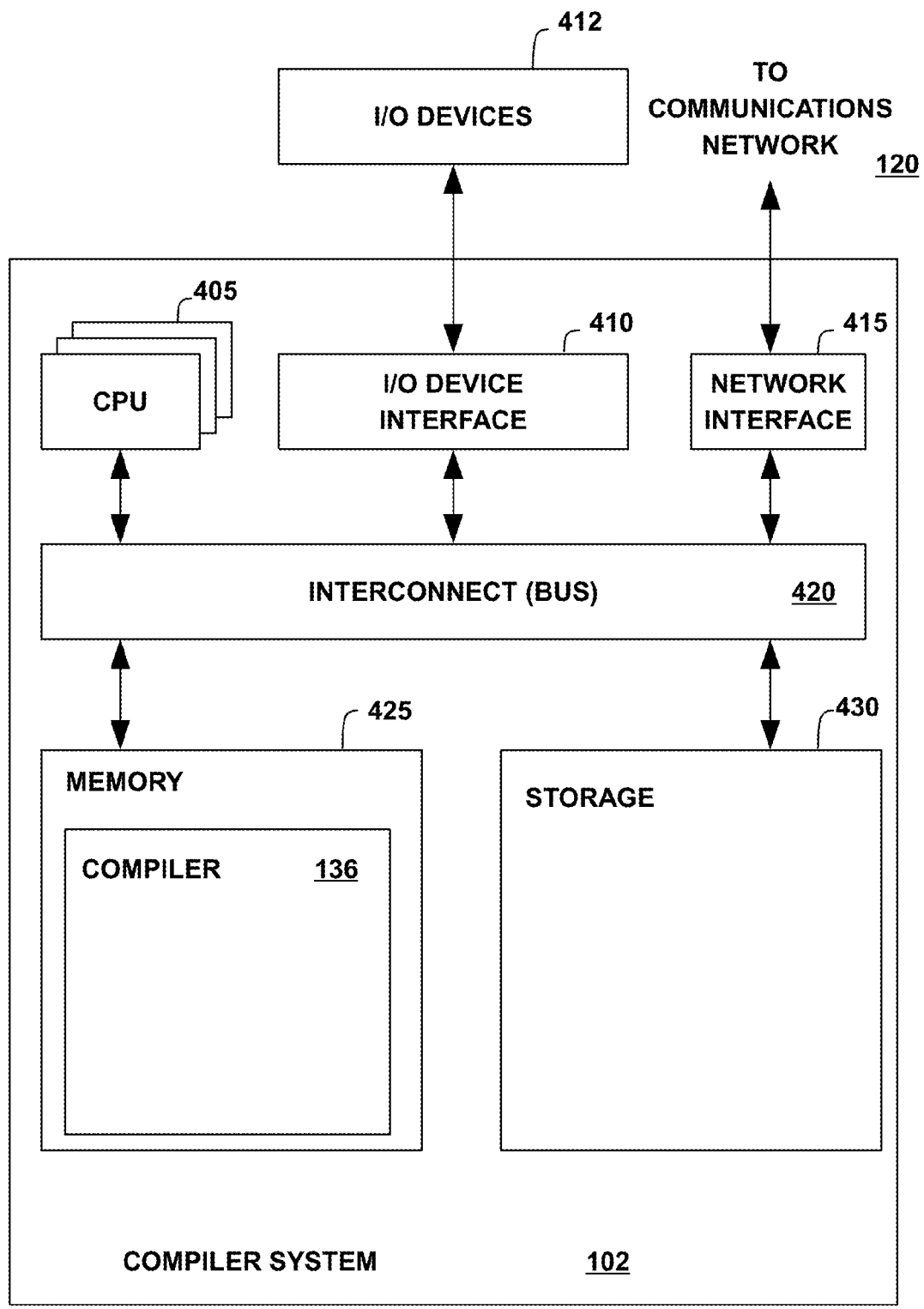
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
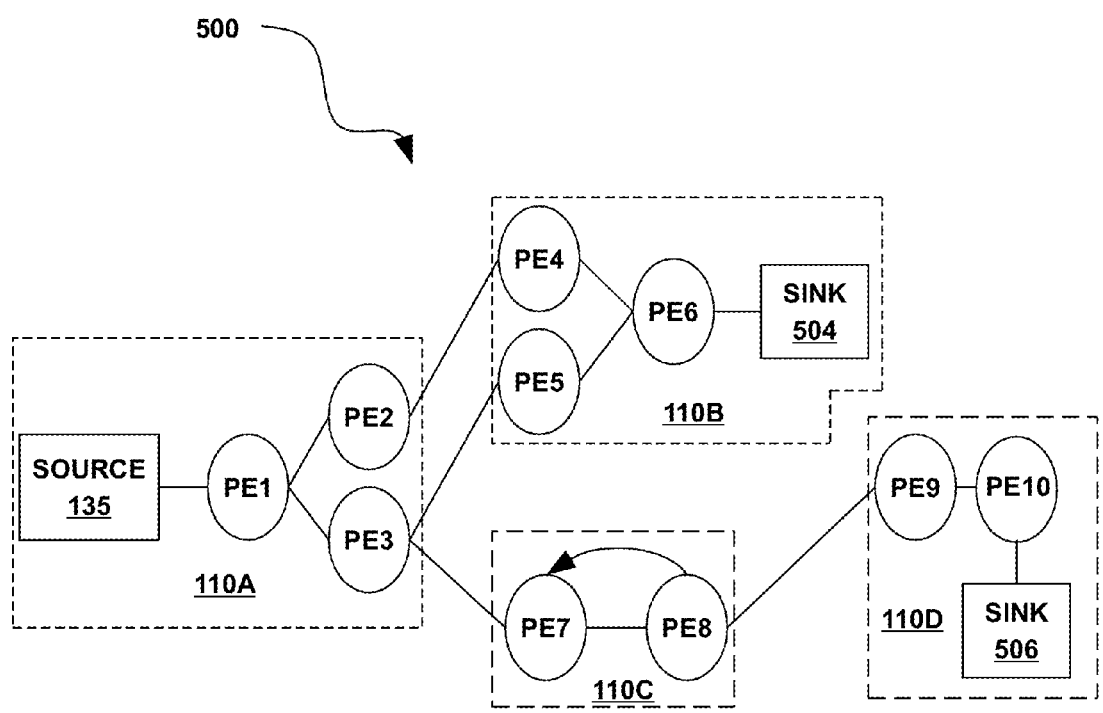
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
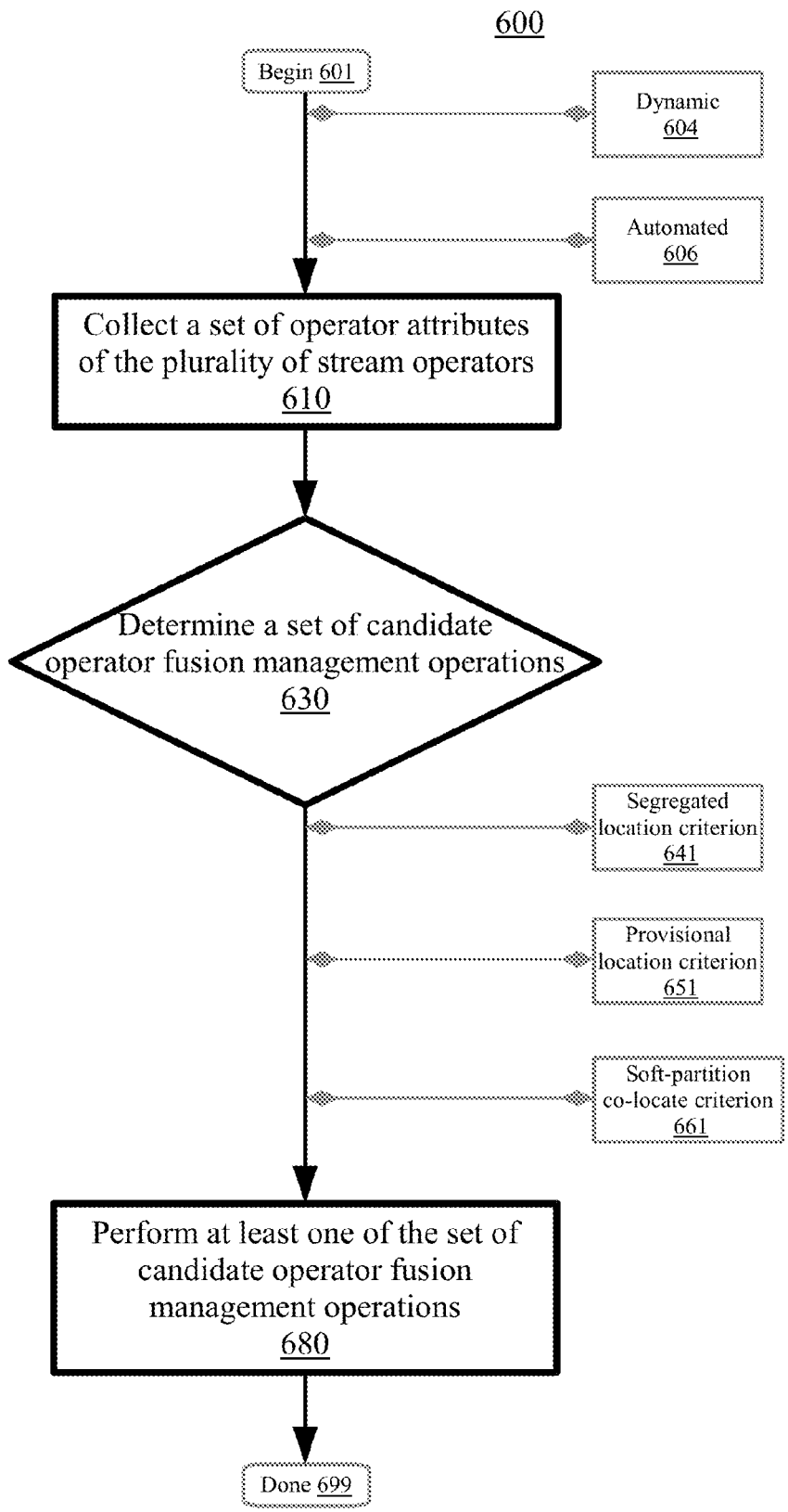
FIG. 6 is a flowchart illustrating a method for operator fusion management in a stream computing environment having a plurality of stream operators, according to embodiments.

FIG. 6 is a flowchart illustrating a method 600 for operator fusion management in a stream computing environment having a plurality of stream operators, according to embodiments. Aspects of the disclosure relate to the recognition that, in some situations, operator fusion constraint checks may not scale in accordance with evolving constraint sets to support high-level constructs (e.g., providing pair-wise compare based messages rather than group-directed messages). Accordingly, aspects of the disclosure relate to managing high-level operator fusion constraints (e.g., segregated location constraints, provisional location constraints, soft partition co-locate constraints) to facilitate stream application efficiency and performance. Aspects of method 600 relate to determining a set of candidate operator fusion management operations based on a set of collected operator attributes for a plurality of stream operators, and performing at least one of the set of candidate operator fusion management operations with respect to the plurality of stream operators. The plurality of stream operators may include data processing units configured to perform operations (e.g., logic-based analysis, attribute modification) on data (e.g., tuples) as part of a stream computing application. The plurality of stream operators may operate on incoming tuples to produce output tuples. Altogether, leveraging management of high-level fusion constraints with respect to a plurality of stream operators may be associated with data processing efficiency and stream application performance. The method 600 may begin at block 601.

In embodiments, the collecting, the determining, the performing, and the other steps described herein may each occur in a dynamic fashion to streamline operator fusion management in the stream computing environment at block 604. For instance, the collecting, the determining, the performing, and the other steps described herein may occur in real-time, ongoing, or on-the-fly. As an example, one or more steps described herein may be performed on-the-fly (e.g., candidate operator fusion management operations may be calculated dynamically in response to detection of sets of operator attributes for different groups of stream operators) in order to streamline (e.g., facilitate, promote, enhance) operator fusion management in the distributed batch data processing environment. Other methods of performing the steps described herein are also possible.

In embodiments, the collecting, the determining, the performing, and the other steps described herein may each occur in an automated fashion without user intervention at block 606. In embodiments, the collecting, the determining, the performing, and the other steps described herein may be carried out by an internal operator fusion management module maintained in a persistent storage device of a local computing device (e.g., network node). In embodiments, the collecting, the determining, the performing, and the other steps described herein may be carried out by an external operator fusion management module hosted by a remote computing device or server (e.g., server accessible via a subscription, usage-based, or other service model). In this way, aspects of operator fusion management may be performed using automated computing machinery without manual action. Other methods of performing the steps described herein are also possible.

At block 610, a set of operator attributes of the plurality of stream operators may be collected by an operator fusion management engine in the stream computing environment. Generally, collecting can include detecting, capturing, sensing, recognizing, ingesting, discovering, or otherwise ascertaining the set of operator attributes of the plurality of stream operators. The set of stream operator attributes may include information regarding the characteristics, properties, or other aspects of the set of stream operators. For instance, the set of stream operator attributes may include settings, parameters, computing capabilities, region/channel identifiers, or other information that characterizes a particular stream operator. As examples, the set of stream operator attributes may indicate the type or function (e.g., join, ingest, sort, functor) of the stream operators, performance characteristics (e.g., system resource allocation, tuple throughput rate) of the set of stream operators, fusion compatibility factors (e.g., low compatibility with a first operator type, high compatibility with a second operator type), stream operator interaction factors (e.g., which stream operators a particular stream operator communicates with, the extent/frequency of communication with other operators) and other properties of the set of stream operators. In embodiments, collecting the set of operator attributes may include using an operator fusion management engine (e.g., software or hardware module configured to regulate and facilitate fusion between one or more stream operators of the stream computing environment) to examine the plurality of stream operators in order to ascertain the set of operator attributes. For instance, in embodiments, collecting may include aggregating historical usage data for the plurality of stream operators, and analyzing it to determine information, properties, and other information that characterizes the performance of the plurality of stream operators in different fusion configurations. As an example, collecting may include examining historical usage data for a group of stream operators, and ascertaining that a first operator has a function type of "filter operator," has a tuple throughput rate of 250 tuples per second, and requires 4 megabytes of memory to operate. Other methods of collecting the set of operator attributes for the plurality of stream operators are also possible.

At block 630, a set of candidate operator fusion management operations may be determined with respect to the plurality of stream operators. The determining may be performed by the operator fusion management engine based on the set of operator attributes. Generally, determining can include calculating, formulating, deriving, computing, or otherwise ascertaining the set of candidate operator fusion management operations. The set of candidate operator fusion management operations may include one or more processes, procedures, or actions for combining a group of stream operators into a processing element, or designating stream operators that should not be fused together. For instance, the set of candidate operator fusion management operations may specify a group of stream operators (e.g., stream operators A, B, and C of the plurality of stream operators) that are recommended to be fused into a single processing element, or a group of stream operators that are recommended not to be fused together. In embodiments, the operator fusion management operations may be determined based on the set of operator attributes for the plurality of stream operators. For instance, the set of operator attributes for the plurality of stream operators may be examined with respect to a set of fusion constraints (e.g., requirements, stipulations, parameters, or other conditions that impact operator fusion) to compute candidate fusion operations that are expected to be associated with positive benefits with respect to stream performance, as well as situations where fusion operations should not be performed with respect to stream operators (e.g., situations where operator fusion may lead to irregular/unstable behavior). As an example, the operator fusion management engine may be configured to compare the set of operator attributes with respect to a set of fusion constraints such as segregated location constraints (e.g., only fusing operators of the same region), provisional location constraints (e.g., operators may be fused with operators in the same region or operators outside the region, but not with operators of different regions), soft partition co-location constraints (e.g., operators can be fused based on user-directed constraints, but not heuristic-based constraints), deployment cluster characteristics (e.g., size and number of hosts), user motivations (e.g., target number of processing elements), application characteristics (e.g., developer expressed constraints), application load conditions (e.g., host resources available for processing elements) or other factors that affect operator fusion in order to ascertain combinations of stream operators that should or should not be fused together. The ascertained stream operator combinations may be identified as the set of candidate fusion management operations. Other methods of determining the set of candidate operator fusion management operations with respect to the plurality of stream operators are also possible.

In embodiments, the set of candidate operator fusion management operations may be determined using a segregated location criterion pertaining to a region of stream operators at block 641. Generally, determining can include calculating, formulating, deriving, computing, or otherwise ascertaining the set of candidate operator fusion management operations based on the segregated location criterion. The segregated location criterion may include a fusion constraint that specifies that operators in a particular region may only be fused together with other operators in the same region. In embodiments, the segregated location criterion may include a soft parameter setting such that the segregated location criterion may be overridden by a user (e.g., user may be allowed to specify a fusion operation that will be implemented prior to application of the segregated location criterion) and a hard parameter setting in which user override is not possible. In embodiments, determining the set of candidate operator fusion management operations may include comparing the plurality of stream operators with the segregated location criterion in order to ascertain whether one or more stream operators achieve the segregated location criterion. As an example, consider a plurality of stream operators A, B, C, D, E, F, G, and H distributed across three different regions of an operator graph. For instance, operators A, B, and C may be deployed in a first region, operators D and E may be deployed in a second region, and operators F, G, and H may be deployed in a third region. Each operator may be compared with the segregated location criterion and evaluated for fusion with respect to each other operator of the plurality of stream operators to determine the set of candidate operator fusion management operations. As an example, a set of candidate operation fusion management operations may be determined that indicates fusion of operators A, B, and C into a first processing element, fusion of operators D and E into a second processing element, and fusion of operators F, G, and H into a third processing element (e.g., such that each operator is only fused with operators in the same region). Other methods of determining the set of candidate operator fusion management operations using the segregated location criterion are also possible.

In embodiments, the set of candidate operator fusion management operations may be determined using a provisional location criterion pertaining to a region of stream operators at block 651. Generally, determining can include calculating, formulating, deriving, computing, or otherwise ascertaining the set of candidate operator fusion management operations based on the provisional location criterion. The provisional location criterion may include a fusion constraint that specifies that operators within the same region may be fused together with other operators in the same region and also operators outside the region (e.g., un-allocated operators), but not with operators deployed to a different region. In embodiments, the provisional location criterion may include a soft parameter setting such that the provisional location criterion may be overridden by a user (e.g., user may be allowed to specify a fusion operation that will be implemented prior to application of the provisional location criterion) and a hard parameter setting in which user override is not possible. In embodiments, determining the set of candidate operator fusion management operations may include comparing the plurality of stream operators with the provisional location criterion in order to ascertain whether one or more stream operators achieve the provisional location criterion. As an example, consider an operator graph having a first region including stream operators A, B, and C, a second region including stream operators E and F, and a set of stream operators G, H, and I that do not belong to any region of the operator graph. Each operator may be compared with the provisional location criterion, and evaluated for fusion with respect to each other operator of the plurality of stream operators to determine the set of candidate operator fusion management operations. As an example, a set of candidate operation fusion management operations may be determined that indicates recommended fusion of operators A, B, C, and G into a first processing element, and fusion of operators D, E, H, and I into a second processing element (e.g., such that each operator is only fused with operators in the same region or operators outside the regions, but not with operators located in different regions). Other methods of determining the set of candidate operator fusion management operations using the provisional location criterion are also possible.

In embodiments, the set of candidate operator fusion management operations may be determined using a soft-partition co-locate criterion pertaining to a region of stream operators at block 661. Generally, determining can include calculating, formulating, deriving, computing, or otherwise ascertaining the set of candidate operator fusion management operations based on the soft-partition co-locate criterion. The soft-partition co-locate criterion may include a fusion constraint that specifies that a group of stream operators may be fused together based on user-directed instructions (e.g., requests, commands), but may not be fused by non-user directed commands (e.g., cannot be fused by automatic heuristic-based methods). For instance, in certain embodiments, a group of operators may be marked with a tag, flag, or other marker that indicates that they may be fused together based on the request of a user, but may not be involved in subsequent fusion operations (e.g., without the permission of a user). In embodiments, determining the set of candidate operator fusion management operations may include identifying stream operators associated with the soft-partition co-locate criterion, and generating candidate operator fusion management operations that do not violate the soft-partition co-locate criterion. As an example, consider a group of stream operators A, B, C, D, E, F, G, and H. Stream operators A, C, E, and G may be associated with a soft-partition co-locate criterion. In embodiments, a user fusion command may be received to fuse operators A and G into a first processing element, and operators C and E into a second processing element. Accordingly, subsequent to implementation of the user fusion command, the operator fusion management engine may remove the first and second processing element from consideration for further heuristic-based operator fusion. As such, a set of candidate operator fusion management operations may be determined that indicate recommended fusion of operators B and H into a third processing element, and operators D and F into a fourth processing element (e.g., such that the first and second processing elements are excluded from automatic operator fusion). Other methods of determining the set of candidate operator fusion management operations using the soft-partition co-locate criterion are also possible.

At block 680, at least one of the set of candidate operator fusion management operations may be performed in the stream computing environment with respect to the plurality of stream operators. Generally, performing can include implementing, initiating, carrying-out, instantiating, completing, or otherwise executing at least one of the set of candidate operator fusion management operations. In embodiments, executing at least one of the set of candidate operator fusion management operations may include initiating fusion of two or more stream operators, or disallowing fusion between two or more stream operators in accordance with the set of determined candidate operator fusion management operations. In embodiments, performing may include constructing a processing element by combining a subset of the plurality of stream operators. In embodiments, performing may indicate marking a subset of the plurality of stream operators with a tag, flag, or other annotation to indicate that they should not be fused with one or more particular stream operators. In certain embodiments, aspects of the disclosure relate to performing multiple candidate operator fusion management operations at the same time, or in a sequence. As an example, consider a stream computing environment having a first region with stream operators A, B, C, and D, and a second region with stream operators E, F, G, and H. Accordingly, in embodiments, stream operators A, B, and C may be fused into a first processing element, stream operators F, G, and H may be fused into a second processing element (e.g., based on the segregated location criterion), and stream operators D and E may be marked with indications that they are not allowed to be fused together (e.g., based on the provisional location criterion). Other methods of performing at least one of the set of candidate operator fusion management operations with respect to the plurality of stream operators are also possible.

Consider the following example. A stream computing environment may have a first region including stream operators A, B, and C, a second region including operators D, E, and F, and a third region including stream operators H, I, and J. An operator fusion management engine may be configured to examine each operator of the plurality of stream operators to determine a set of operator attributes. In embodiments, it may be ascertained that operators A, E, F, and I are associated with an operator attribute that indicates a first Java JVM (trademark of The Oracle Corporation) parameter setting, operators B and H are associated with a second Java JVM parameter setting, and operators C, D, and J are not associated with any explicit Java JVM parameter setting. The operator fusion management engine may compare the set of operator attributes with a set of fusion constraints to determine a set of candidate operator fusion management operations, and ascertain that the set of operator attributes are associated with a provisional location constraint (e.g., key=JVM_args) that indicates that stream operators may be fused with other operators that have the same Java JVM parameter setting or no explicit setting, but may not be fused with stream operators that have different Java JVM parameter settings specified. The plurality of stream operators may also be associated with a fusion constraint that indicates that a user/administrator of the stream computing environment wishes to fuse the plurality of stream operators into no more than two processing elements. Accordingly, the operator fusion management engine may determine a set of candidate operator fusion management operations with respect to the plurality of operators. For instance, a first candidate operator fusion management operation may be determined in which operators A, C, D, E, F, I, and J are fused into a first processing element (e.g., all operators have the first Java JVM parameter setting or no specified Java JVM parameter setting) and operators B and H are fused into a second processing element (e.g., all operators have the second Java JVM parameter setting). In embodiments, a second candidate operator fusion management operation may be determined in which operators A, E, F, and I are fused into a first processing element, and operators B, C, D, H, and J are fused into a second processing element (e.g., all operators have the second Java JVM parameter setting or no specified JVM parameter setting). In embodiments, a third candidate operator fusion management operation may be determined in which operators A, E, F, I and J are fused into a first processing element, and operators B, C, D, and H are fused into a second processing element. Other candidate operator fusion management operations are also possible. As described herein, one or more of the candidate operator fusion management operations may be selected (e.g., based on other fusion constraints, resource usage profiles), and performed. For instance, in certain embodiments, the second candidate operator fusion management operation may be performed such that operators A, E, F, and I are fused into a first processing element, and operators B, C, D, H, and J are fused into a second processing element. Other methods of managing operator fusion management based on a set of operator attributes of a plurality of stream operators are also possible.

Method 600 concludes at block 699. As described herein, aspects of method 600 relate to operator fusion management in a stream computing environment having a plurality of stream operators. Aspects of method 600 may provide performance or efficiency benefits related to stream application deployment. As an example, stream operator fusion management operations may be determined based on high-level constraints (e.g., segregated location constraints, provisional location constraints, soft partition co-locate constraints) to support higher-level operator graph constructs. Altogether, leveraging management of high-level fusion constraints with respect to a plurality of stream operators may be associated with data processing efficiency and stream application performance.

Figure 7:
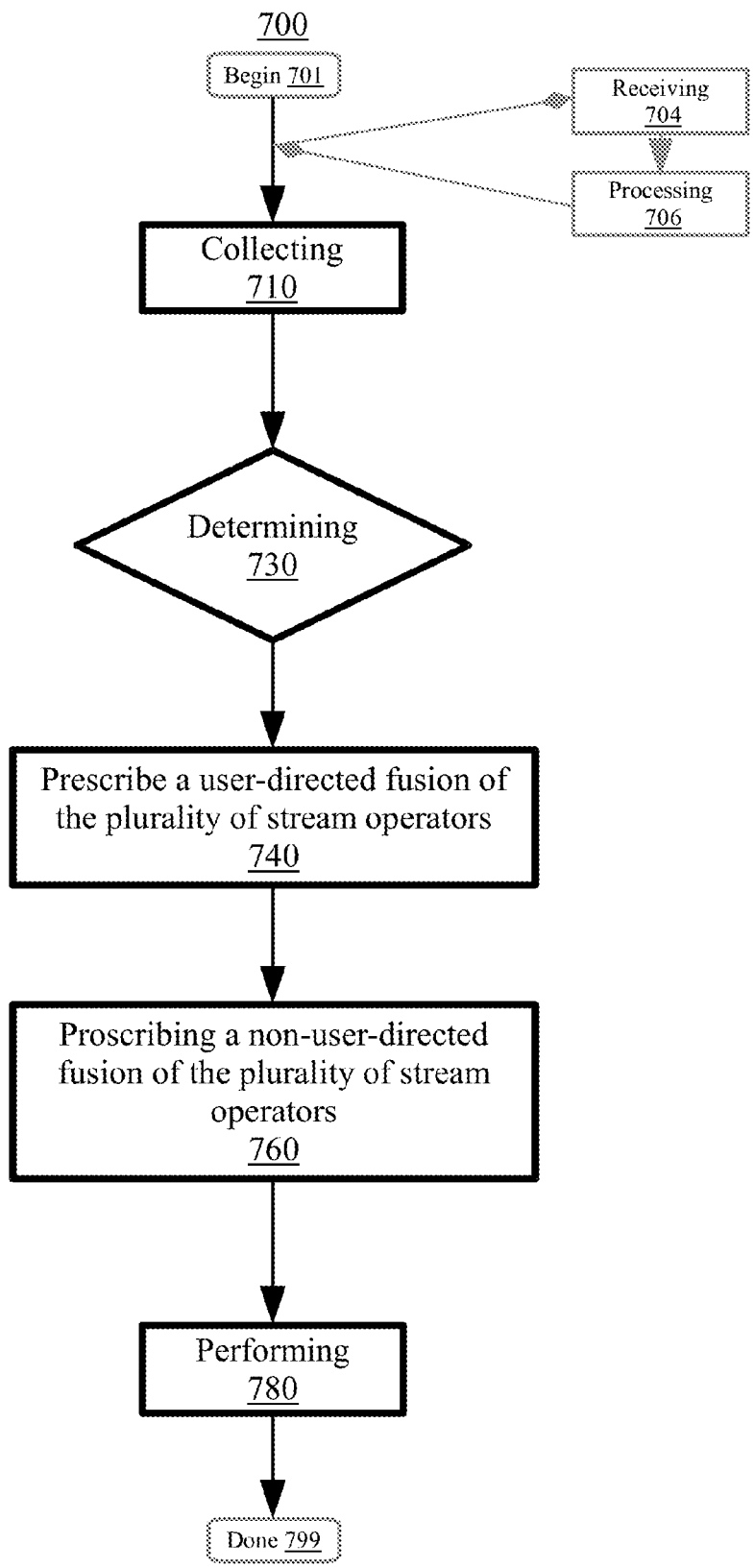
FIG. 7 is a flowchart illustrating a method for operator fusion management in a stream computing environment having a plurality of stream operators, according to embodiments.

FIG. 7 is a flowchart illustrating a method 700 for operator fusion management in a stream computing environment having a plurality of stream operators, according to embodiments. Aspects of method 700 may be similar or the same as aspects of method 600, and aspects may be utilized interchangeably with one or more methodologies described herein. The method 700 may begin at block 701.

At block 704, a stream of tuples may be received. The stream of tuples may be processed by a plurality of processing elements (e.g., stream operators) operating on a set of compute nodes (e.g., in a stream application environment). The stream of tuples may be received consistent with the description herein including FIGS. 1-11. Current/future processing by the plurality of processing elements may be performed consistent with the description herein including FIGS. 1-11. The set of compute nodes may include a shared pool of configurable computing resources. For example, the set of compute nodes can be a public cloud environment, a private cloud environment, a distributed batch data processing environment, or a hybrid cloud environment. In certain embodiments, each of the set of compute nodes are physically separate from one another.

At block 706, the stream of tuples may be processed. The stream of tuples may be processed by the plurality of processing elements operating on the set of compute nodes. The stream of tuples may be processed consistent with the description herein including FIGS. 1-11. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

At block 710, a set of operator attributes of the plurality of stream operators may be collected by an operator fusion management engine in the stream computing environment. At block 730, a set of candidate operator fusion management operations may be determined with respect to the plurality of stream operators. The determining may occur by the operator fusion management engine based on the set of operator attributes.

At block 740, a user-directed fusion of the plurality of stream operators may be prescribed related to an inclusion-exclusion determination of the set of candidate operator fusion management operations with respect to the plurality of stream operators. Aspects of the disclosure relate to the recognition that in some situations, it may be desirable to obtain user input (e.g., endorsement) with respect to one or more fusion operations. Generally, prescribing can include instructing, establishing, directing, commanding, defining, assigning, or otherwise specifying the user-directed fusion of the plurality of stream operators related to the inclusion-exclusion determination. The inclusion-exclusion determination may include a definition, indication, or designation of what fusion operations may be performed on different stream operators or groups of stream operators of the stream computing environment. The inclusion-exclusion determination may define which stream operators are eligible for inclusion (e.g., participation) in fusion operations, and which stream operators are not eligible (e.g., unsuitable) for fusion operations. In embodiments, prescribing the user-directed fusion may include prompting a user to provide input regarding how to fuse a group of stream operators. As an example, for a plurality of stream operators including operators A, B, C, and D, the operator fusion management module may prompt a user to define which of the operators may be fused into processing elements, combinations of operators that should not be fused together, combinations of operators associated with positive performance impacts, and the like. Accordingly, in response to the prompt, the user may provide input to the stream computing environment to indicate a user-directed fusion. As an example, the user may indicate that operators B and D should be fused together into a single processing element, and operators A and C should not be fused together. Other methods of prescribing a user-defined fusion are also possible.

At block 760, a non-user directed fusion of the plurality of stream operators may be proscribed related to the inclusion-exclusion determination of the set of candidate operator fusion management operations with respect to the plurality of stream operators. Aspects of the disclosure relate to the recognition that, in some situations, it may be desirable to avoid particular fusion operations (e.g., without the permission/endorsement of a user). Generally, proscribing can include forbidding, disallowing, denying, rejecting, prohibiting, or otherwise preventing a non-user directed fusion. In embodiments, proscribing may include marking a subset of stream operators with a tag, flag, or other identifier that indicates that they are not eligible for one or more fusion operations unless specifically directed by a user. As an example, a user may provide input to the stream computing environment to define a user-directed fusion between two stream operators, and mark the resulting processing element with a tag to proscribe performance of subsequent fusion operations with respect to the processing element. Accordingly, the operator fusion management engine may prevent performance of heuristic-based (e.g., automatic) operator fusion management operations involving the processing element. Other methods of proscribing non-user directed fusions are also possible.

At block 780, at least one of the set of candidate operator fusion management operations may be performed in the stream computing environment with respect to the plurality of stream operators. Method 700 concludes at block 799. As described herein, aspects of method 700 relate to operator fusion management in a stream computing environment having a plurality of stream operators. Aspects of method 700 may provide performance or efficiency benefits related to stream application deployment (e.g., data processing efficiency and stream application performance).

Figure 8:
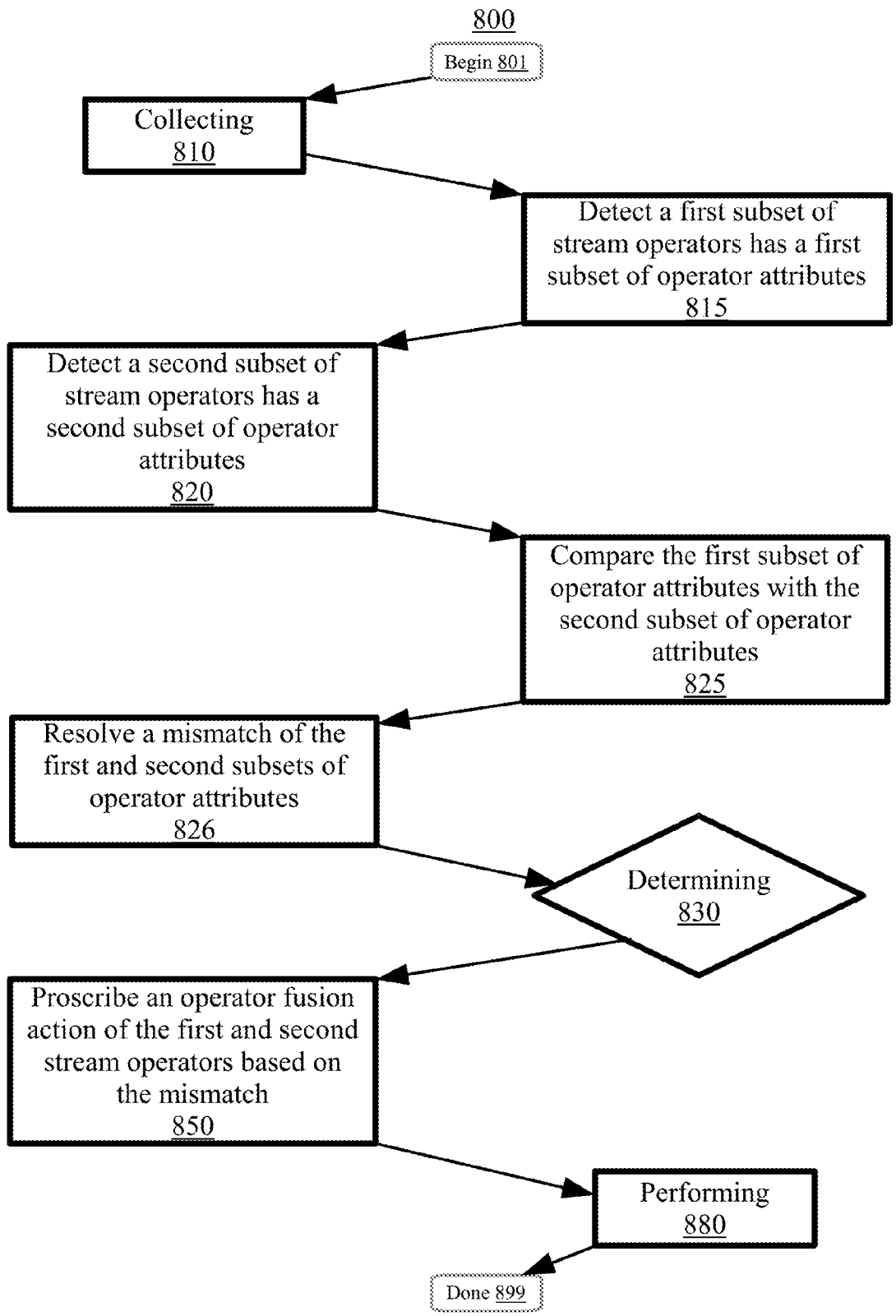
FIG. 8 is a flowchart illustrating a method for operator fusion management in a stream computing environment having a plurality of stream operators, according to embodiments.

FIG. 8 is a flowchart illustrating a method 800 for operator fusion management in a stream computing environment having a plurality of stream operators, according to embodiments. Aspects of method 800 may be similar or the same as aspects of method 600/700, and aspects may be utilized interchangeable with one or more methodologies described herein. The method 800 may begin at block 801. At block 810, a set of operator attributes of the plurality of stream operators may be collected by an operator fusion management engine in the stream computing environment. Altogether, leveraging management of high-level fusion constraints with respect to a plurality of stream operators may be associated with data processing efficiency and stream application performance.

At block 815, it may be detected that a first subset of stream operators of the plurality of stream operators has a first subset of operator attributes of the set of operator attributes. Generally, detecting can include sensing, recognizing, discovering, ascertaining, or otherwise identifying that the first subset of stream operators of the plurality of stream operators has the first subset of operator attributes of the set of operator attributes. The first subset of operator attributes may include a portion of the settings, parameters, computing capabilities, region/channel identifiers, or other information that characterizes the first subset of stream operators. In embodiments, detecting may include using the operator fusion management engine to parse the first subset of stream operators to ascertain the first subset of operator attributes. As an example, the operator fusion management engine may parse the first subset of stream operators and determine a first subset of operator attributes that indicates that the first subset of stream operators are associated with a software version of 7.4.11. At block 820, it may be detected that a second subset of stream operators of the plurality of stream operators has a second subset of operator attributes of the set of operator attributes. As described herein, the second subset of operator attributes may include a portion of the settings, parameters, computing capabilities, region/channel identifiers, or other information that characterizes the second subset of stream operators. In embodiments, detecting may include analyzing the second subset of stream operators and determining a second subset of operator attributes that indicate that the second subset of stream operators are associated with a software version of 7.6.24. Other methods of detecting the first subset of operator attributes for the first subset of stream operators and the second subset of operator attributes for the second subset of stream operators are also possible.

At block 825, the first subset of operator attributes of the set of operator attributes may be compared with the second subset of operator attributes of the set of operator attributes. The comparing may occur to determine the set of candidate operator fusion management operations with respect to the plurality of stream operators. Generally, comparing can include contrasting, investigating, correlating, juxtaposing, or analyzing the first and second subsets of operator attributes in parallel. In embodiments, comparing may include examining the first subset of operator attributes and the second subset of operator attributes with respect to one another to identify mutual similarities and differences. For instance, comparing may include ascertaining both attributes that are shared between the first and second subsets of operators, as well as attributes that are dissimilar (e.g., divergent, different) between the first and second subsets of operators. As an example, the software version of 7.4.11 of the first subset of stream operators may be compared with the software version of 7.6.24 of the second subset of stream operators. Other methods of comparing the first subset of operator attributes with the second subset of operator attributes are also possible.

At block 826, a mismatch of the first and second subsets of operator attributes of the set of operator attributes may be resolved based on the comparing. The mismatch may be resolved to determine the set of candidate operator fusion management operations with respect to the plurality of stream operators. Generally, resolving can include computing, concluding, formulating, ascertaining, or otherwise determining the mismatch of the first and second subsets of operator attributes. The mismatch may include a discrepancy, disparity, divergence, inequality, incongruity, or other difference between the first subset of operator attributes and the second subset of the operator attributes. In embodiments, resolving the mismatch may include ascertaining that one or more attributes of the first subset of operator attributes does not achieve a similarity threshold with respect to one or more attributes of the second subset of operator attributes. As an example, in response to comparing the software version of 7.4.11 of the first subset of stream operators with the software version of 7.6.24 of the second subset of stream operators, it may be determined that the two software versions mismatch with respect to one another. Other methods of resolving the mismatch of the first and second subsets of operator attributes are also possible. At block 830, a set of candidate operator fusion management operations may be determined with respect to the plurality of stream operators. The determining may occur by the operator fusion management engine based on the set of operator attributes.

At block 850, an operator fusion action of the first and second stream operators may be proscribed based on the mismatch. The operator fusion action may be proscribed related to an inclusion-exclusion determination of the set of candidate operator fusion management operations with respect to the plurality of stream operators. Aspects of the disclosure relate to the recognition that, in some situations, it may be desirable to prevent (e.g., proscribe) fusion between streaming operators that differ with respect to one or more attributes. Generally, proscribing can include forbidding, disallowing, denying, rejecting, prohibiting, or otherwise preventing an operator fusion action of the first and second stream operators based on the mismatch. In embodiments, proscribing may include modifying a set of fusion action permissions with respect to the first and second stream operators. The set of fusion action permissions may include a list of permitted or authorized fusion actions that may be performed with respect to particular stream operators. For instance, in certain embodiments, fusion action permissions for stream operators may be edited to prevent fusion actions between stream operators associated with mismatches with respect to one another. As an example, in response to determining a mismatch between the first and second stream operators, fusion action permissions for both the first and second stream operators may be modified to prohibit fusion with respect to one another. Other methods of proscribing a fusion action of the first and second stream operators based on the mismatch are also possible.

At block 880, at least one of the set of candidate operator fusion management operations may be performed in the stream computing environment with respect to the plurality of stream operators. Method 800 concludes at block 899. As described herein, aspects of method 800 relate to operator fusion management in a stream computing environment having a plurality of stream operators. Aspects of method 800 may provide performance or efficiency benefits (e.g., data processing efficiency and stream application performance) related to stream application deployment.

Figure 9:
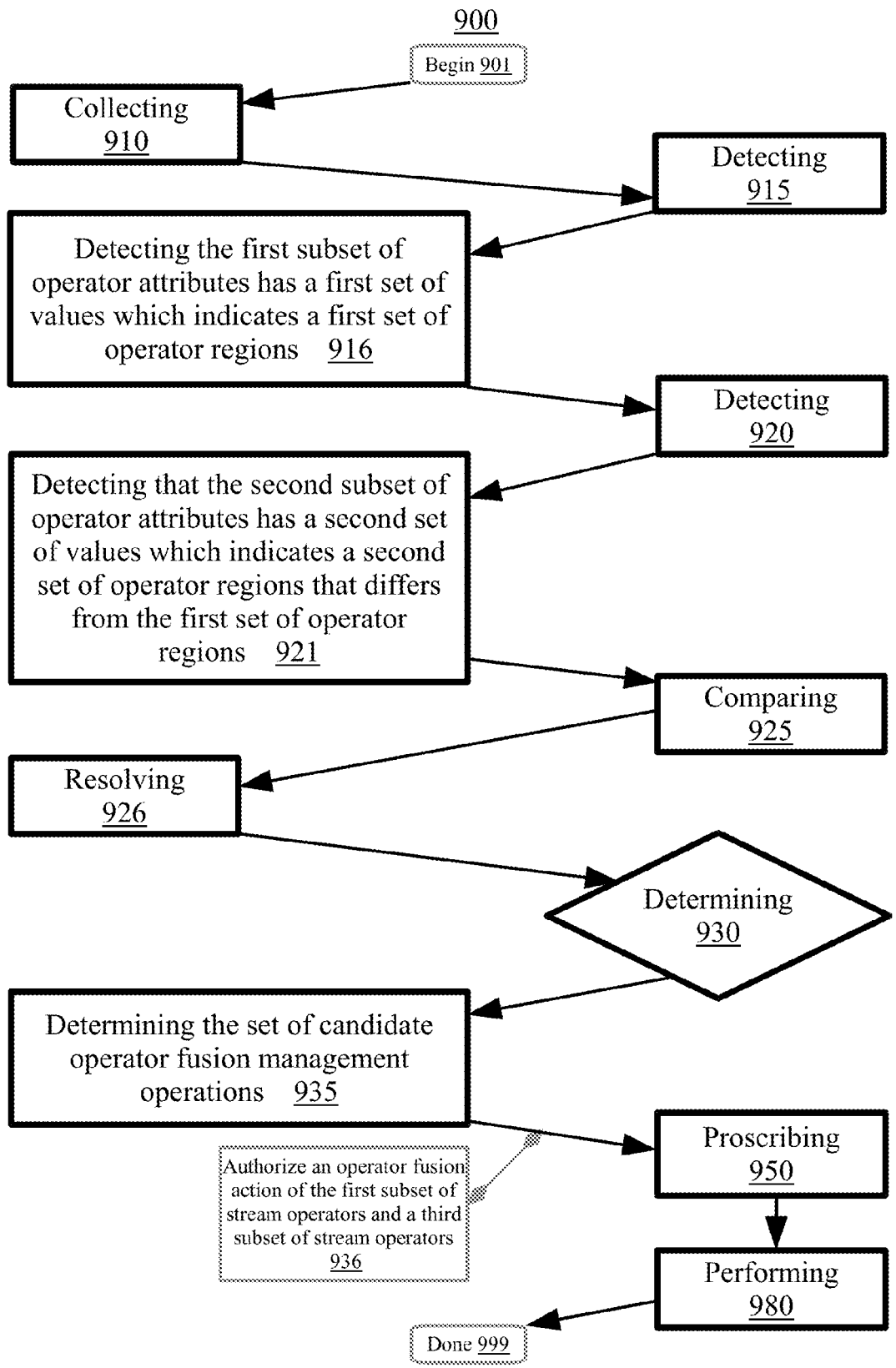
FIG. 9 is a flowchart illustrating a method for operator fusion management in a stream computing environment having a plurality of stream operators, according to embodiments.

FIG. 9 is a flowchart illustrating a method 900 for operator fusion management in a stream computing environment having a plurality of stream operators, according to embodiments. Aspects of method 900 may be similar or the same as aspects of method 600/700/800, and aspects may be utilized interchangeable with one or more methodologies described herein. The method 900 may begin at block 901. At block 910, a set of operator attributes of the plurality of stream operators may be collected by an operator fusion management engine in the stream computing environment. Altogether, leveraging management of high-level fusion constraints with respect to a plurality of stream operators may be associated with data processing efficiency and stream application performance. At block 915, it may be detected that a first subset of stream operators of the plurality of stream operators has a first subset of operator attributes of the set of operator attributes.

At block 916, it may be detected that the first subset of operator attributes has a first set of values which indicates a first set of operator regions. Generally, detecting can include sensing, recognizing, discovering, ascertaining, or otherwise identifying that the first subset of operator attributes has a first set of values which indicates a first set of operator regions. The first set of operator regions may include one or more particular areas, branches, or channels within an operator graph. In embodiments, the first set of operator regions may be configured to receive deployment of one or more stream operators of the plurality of stream operators (e.g., a first subset of stream operators). The first set of values may include markers, tags, parameters, alphanumeric characters, symbols, or other indicators that identify (e.g., call out, reference) one or more particular regions of the first set of operator regions. In embodiments, detecting the first set of values may include analyzing the first subset of operator attributes to ascertain a region parameter setting that lists one or more operator regions corresponding to the first subset of stream operators. As an example, the first subset of operator attributes may be examined, and a region parameter setting of "Region 3 Allocation" (e.g., indicating that the first subset of stream operators are deployed to a third region of the operator graph) may be detected. At block 920, it may be detected that a second subset of stream operators of the plurality of stream operators has a second subset of operator attributes of the set of operator attributes. At block 921, it may be detected that the second subset of operator attributes has a second set of values which indicates a second set of operator regions that differs from the first set of operator regions. As described herein, the second set of operator regions may include one or more particular areas, branches, or channels within an operator graph. The second set of operator regions may be different than the first set of operator regions. For instance, the second set of operator regions may be mutually exclusive with respect to the first set of operator regions, such that no region is included in both the first and second sets of operator regions at the same time. The second set of values may include markers, tags, parameters, alphanumeric characters, symbols, or other indicators that identify (e.g., call out, reference) one or more particular regions of the second set of operator regions. For instance, detecting the second subset of values may include analyzing the second subset of operator attributes, and identifying a region parameter setting of "Region 11 Allocation" (e.g., indicating that the second subset of stream operators are deployed to an eleventh region of the operator graph). Other methods of detecting that the first and second subsets of operator attributes have first and second sets of values which indicate first and second sets of operator regions are also possible.

At block 925, the first subset of operator attributes of the set of operator attributes may be compared with the second subset of operator attributes of the set of operator attributes. The comparing may occur to determine the set of candidate operator fusion management operations with respect to the plurality of stream operators. At block 926, a mismatch of the first and second subsets of operator attributes of the set of operator attributes may be resolved based on the comparing. The mismatch may be resolved to determine the set of candidate operator fusion management operations with respect to the plurality of stream operators. At block 930, a set of candidate operator fusion management operations may be determined with respect to the plurality of stream operators. The determining may occur by the operator fusion management engine based on the set of operator attributes.

At block 935, the set of candidate operator fusion management operations may be determined based on the first and second sets of values. The determining may be performed by the operator fusion management engine. Generally, determining can include calculating, formulating, deriving, computing, or otherwise ascertaining the set of candidate operator fusion management operations based on the first and second sets of values. As described herein, the set of candidate operator fusion management operations may include one or more processes, procedures, or actions for combining a group of stream operators into a processing element, or designating stream operators that should not be fused together. In embodiments, determining the set of candidate operator fusion management operations may include examining the first and second sets of values, and computing different combinations of stream operators based on the fusion constraints allowed by different operator allocation locations. For instance, in embodiments, determining may include generating a candidate operator fusion management operation to combine a group of stream operators that are associated with the same value of the set of values (e.g., merging operators allocated to the same region of the operator graph). In embodiments, determining may include preventing combination of one or more stream operators with stream operators that have different values of the set of values (e.g., proscribing fusion between operators allocated to different regions of the operator graph). Other methods of determining the set of candidate operator fusion management operations based on the first and second sets of values are also possible.

In embodiments, an operator fusion action of the first subset of stream operators and a third subset of stream operators having a third subset of operator attributes which does not indicate the second set of operator regions may be authorized at block 936. The authorizing may be related to the inclusion-exclusion determination of the set of candidate operator fusion management operations with respect to the plurality of stream operators. Aspects of the disclosure relate to the recognition that, in some situations, it may be desirable to allow fusion between operators located in the same region (e.g., associated with the same region parameter setting) or outside a region (e.g., unallocated operators), but not allow fusion between operators in different regions. Generally, authorizing can include allowing, approving, granting, or otherwise permitting the operator fusion action of the first subset of stream operators and the third subset of stream operators. As described herein, the first subset of stream operators may be associated with a first subset of operator attributes which indicates a first set of operator regions (e.g., Region 3). The third subset of stream operators may be associated with a third subset of operator attributes (e.g., parameters, settings) that do not indicate the second set of operator regions. In embodiments, the third subset of stream operators may include stream operators that are not allocated to a particular region of the operator graph, and therefore have a region parameter setting of "undefined." In embodiments, authorizing the operator fusion action may include modifying a set of fusion action permissions to allow fusion between the first and third subsets of stream operators. As such, stream operators may be fused with other stream operators having the same value of the set of values (e.g., the same region parameter) or stream operators not associated with a different value of the set of values. Other methods of authorizing the operator fusion action of the first and third subsets of stream operators are also possible.

At block 950, an operator fusion action of the first and second stream operators may be proscribed based on the mismatch. The operator fusion action may be proscribed related to an inclusion-exclusion determination of the set of candidate operator fusion management operations with respect to the plurality of stream operators. At block 980, at least one of the set of candidate operator fusion management operations may be performed in the stream computing environment with respect to the plurality of stream operators. Method 900 concludes at block 999. As described herein, aspects of method 900 relate to operator fusion management in a stream computing environment having a plurality of stream operators. Aspects of method 900 may provide performance or efficiency benefits (e.g., data processing efficiency and stream application performance) related to stream application deployment.

Figure 10:
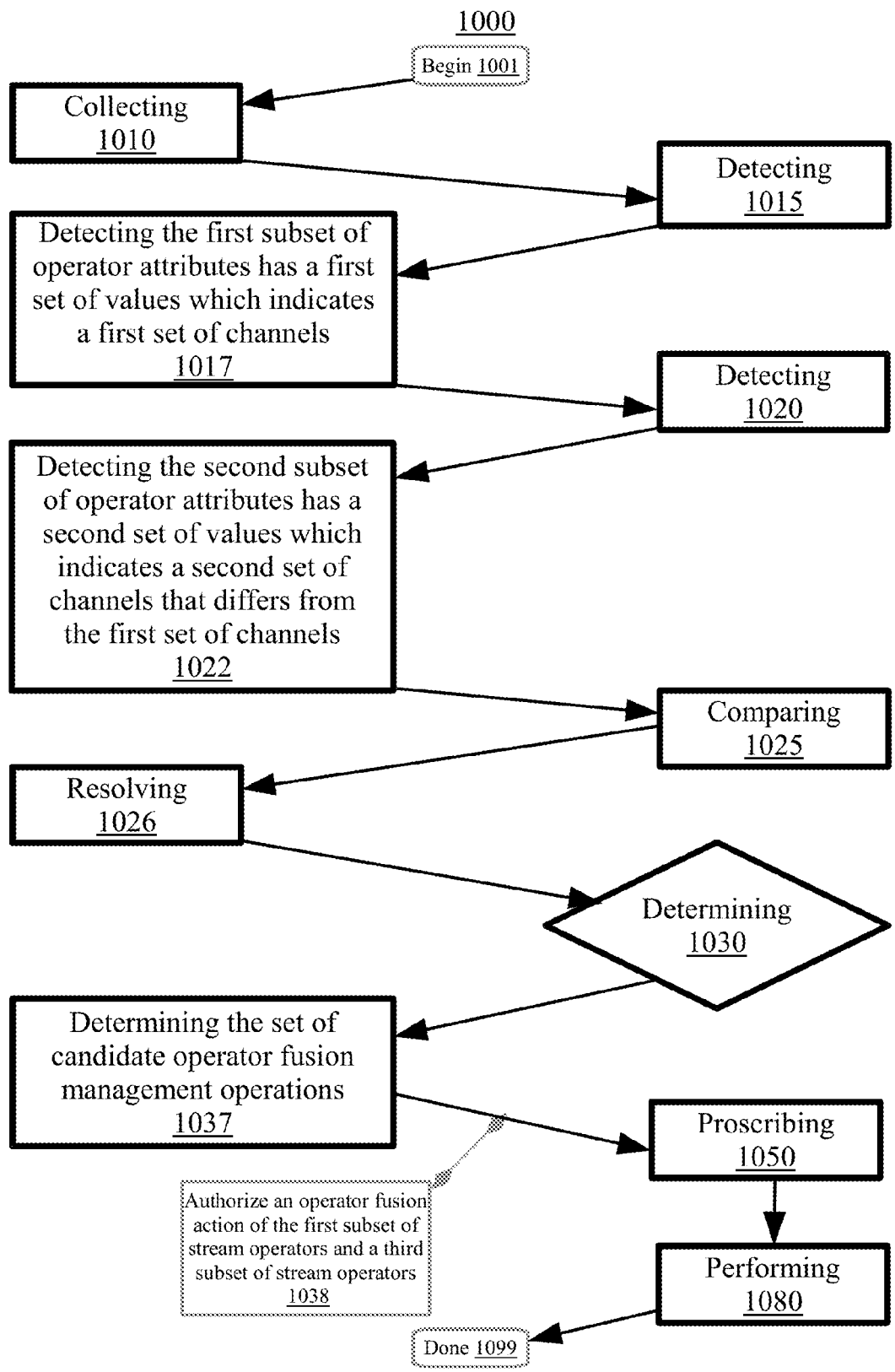
FIG. 10 is a flowchart illustrating a method for operator fusion management in a stream computing environment having a plurality of stream operators, according to embodiments.

FIG. 10 is a flowchart illustrating a method 1000 for operator fusion management in a stream computing environment having a plurality of stream operators, according to embodiments. Aspects of method 1000 may be similar or the same as aspects of method 600/700/800/900, and aspects may be utilized interchangeable with one or more methodologies described herein. The method 1000 may begin at block 1001. At block 1010, a set of operator attributes of the plurality of stream operators may be collected by an operator fusion management engine in the stream computing environment. At block 1015, it may be detected that a first subset of stream operators of the plurality of stream operators has a first subset of operator attributes of the set of operator attributes.

At block 1017, it may be detected that the first subset of operator attributes has a first set of values which indicates a first set of channels of a first set of operator regions. Generally, detecting can include sensing, recognizing, discovering, ascertaining, or otherwise identifying that the first subset of operator attributes has a first set of values which indicates a first set of channels of the first set of operator regions. The first set of channels may include a particular group of branches or paths for data flow within a region of an operator graph. The first set of channels may include subdivisions of regions configured to direct a stream of tuples from one point to another within the operator graph. In embodiments, detecting the first set of channels may include analyzing the first subset of operator attributes to ascertain a channel parameter setting that lists one or more channels within a region of the operator graph. As an example, the first subset of operator attributes may be examined, and a channel parameter setting of "Region 3 Channels 9-14 Allocation" (e.g., indicating that the first subset of stream operators is deployed between the ninth and fourteenth channels of a third region of the operator graph) may be detected. At block 1020, it may be detected that a second subset of stream operators of the plurality of stream operators has a second subset of operator attributes of the set of operator attributes. At block 1022, it may be detected that the second subset of operator attributes has a second set of values which indicates a second set of channels of the first set of operator regions that differs from the first set of channels. As described herein, the second set of channels may include one or more branches or paths configured to direct a stream of tuples from one point to another within the operator graph. The second set of channels may differ (e.g., be mutually exclusive) with respect to the first set of channels. In embodiments, detecting the second set of channels may include analyzing the second subset of operator attributes, and identifying a channel parameter setting of "Region 3 Channels 2-8 Allocation" (e.g., indicating that the second subset of stream operators are deployed between the second and eighth channels of the third region of the operator graph). Other methods of detecting that the first and second subsets of operator attributes have first and second sets of values which indicate first and second sets of channels of the operator regions are also possible.

At block 1025, the first subset of operator attributes of the set of operator attributes may be compared with the second subset of operator attributes of the set of operator attributes. The comparing may occur to determine the set of candidate operator fusion management operations with respect to the plurality of stream operators. At block 1026, a mismatch of the first and second subsets of operator attributes of the set of operator attributes may be resolved based on the comparing. The mismatch may be resolved to determine the set of candidate operator fusion management operations with respect to the plurality of stream operators. At block 1030, a set of candidate operator fusion management operations may be determined with respect to the plurality of stream operators. The determining may occur by the operator fusion management engine based on the set of operator attributes.

At block 1037, the set of candidate operator fusion management operations may be determined by the operator fusion management engine based on the first and second sets of values. The determining may occur with respect to the plurality of stream operators. Generally, determining can include calculating, formulating, deriving, computing, or otherwise ascertaining the set of candidate operator fusion management operations based on the first and second sets of values. As described herein, the set of candidate operator fusion management operations may include one or more processes, procedures, or actions for combining a group of stream operators into a processing element, or designating stream operators that should not be fused together. In embodiments, determining the set of candidate operator fusion management operations may include examining the first and second sets of values, and computing different combinations of stream operators based on the fusion constraints allowed by different operator allocation locations. For instance, in embodiments, determining may include generating a candidate operator fusion management operation to combine a group of stream operators that are associated with the same value of the set of values (e.g., merging operators allocated to the same channel of the operator graph). As an example, in certain embodiments stream operators may only be fused with other stream operators that are allocated to the same channel of the same region of the operator graph (e.g., two operators both located in channel 6 of region 8 may be fused.) In embodiments, determining may include preventing combination of one or more stream operators with stream operators that have different values of the set of values (e.g., proscribing fusion between operators allocated to different channels of the operator graph). For instance, a stream operator in channel 4 of region 7 and a stream operator in channel 6 of region 7 may be prevented from being fused. Other methods of determining the set of candidate operator fusion management operations based on the first and second sets of values are also possible.

In embodiments, an operator fusion action of the first subset of stream operators and a third subset of stream operators having a third subset of operator attributes which does not indicate the second set of channels may be authorized at block 1038. The authorizing may be related to the inclusion-exclusion determination of the set of candidate operator fusion management operations with respect to the plurality of stream operators. Aspects of the disclosure relate to the recognition that, in some situations, it may be desirable to allow fusion between operators located in the same channel (e.g., associated with the same channel parameter setting) or outside a channel (e.g., unallocated operators), but not allow fusion between operators in different channels. Generally, authorizing may include allowing, approving, granting, or otherwise permitting the operator fusion action of the first subset of stream operators and the third subset of stream operators. As described herein, the first subset of stream operators may be associated with a first subset of operator attributes which indicates a first set of operator region channels (e.g., Channel 14 of Region 4). The third subset of stream operators may be associated with a third subset of operator attributes (e.g., parameters, settings) that do not indicate the second set of channels. In embodiments, the third subset of stream operators may include stream operators that are not allocated to a particular region or channel of the operator graph, and therefore have a channel parameter setting of "undefined." In embodiments, authorizing the operator fusion action may include modifying a set of fusion action permissions to allow fusion between the first and third subsets of stream operators. As such, stream operators may be fused with other stream operators having the same value of the set of values (e.g., the same channel parameter) or stream operators not associated with a different value of the set of values. Other methods of authorizing the operator fusion action of the first and third subsets of stream operators are also possible.

At block 1050, an operator fusion action of the first and second stream operators may be proscribed based on the mismatch. The operator fusion action may be proscribed related to an inclusion-exclusion determination of the set of candidate operator fusion management operations with respect to the plurality of stream operators. At block 1080, at least one of the set of candidate operator fusion management operations may be performed in the stream computing environment with respect to the plurality of stream operators. Method 1000 concludes at block 1099. As described herein, aspects of method 1000 relate to operator fusion management in a stream computing environment having a plurality of stream operators. Aspects of method 1000 may provide performance or efficiency benefits (e.g., data processing efficiency and stream application performance) related to stream application deployment.

Figure 11:
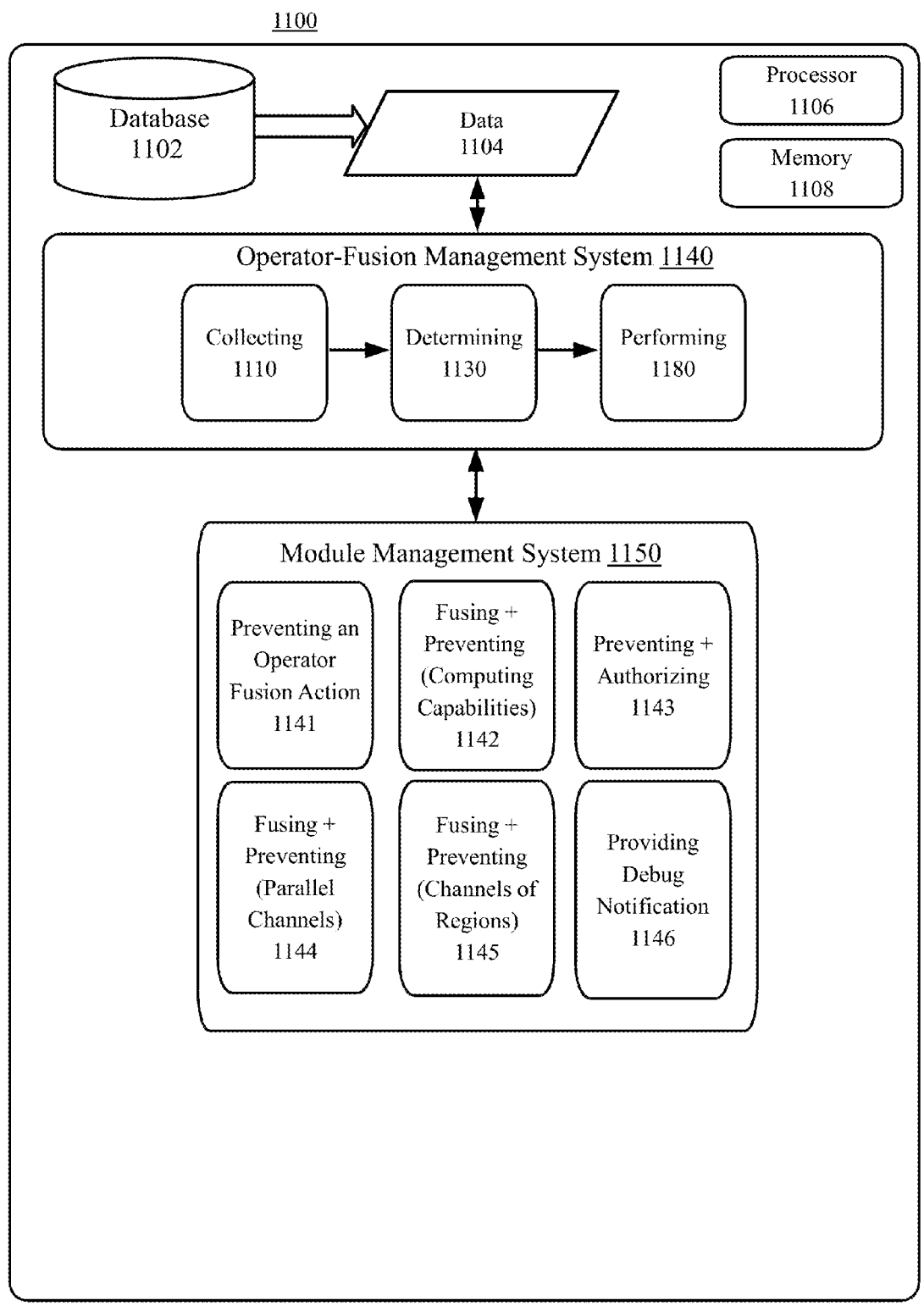
FIG. 11 depicts an example system for operator fusion management in a stream computing environment having a plurality of stream operators, according to embodiments.

FIG. 11 depicts an example system 1100 for operator fusion management in a stream computing environment having a plurality of stream operators, according to embodiments. The example system 1100 may include a processor 1106 and a memory 1108 to facilitate implementation of historical development data management. The example system 1100 may include a database 1102 configured to maintain data used for operator fusion management. In embodiments, the example system 1100 may include an operator fusion management system 1140. The operator fusion management system 1140 may be communicatively connected to the database 1102, and be configured to receive data 1104 related to operator fusion management. The operator fusion management system 1140 may include a collecting module 1110 to collect a set of operator attributes of the plurality of stream operators, a determining module 1130 to determine a set of candidate operator fusion management operations with respect to the plurality of stream operators, and a performing module 1180 to perform at least one of the set of candidate operator fusion management operations. The operator fusion management system 1140 may be communicatively connected with a module management system 1150 which includes a set of modules for implementing aspects of operator fusion management.

In embodiments, an operator fusion action may be prevented at module 1141. The preventing may occur with respect to a first stream operator having a first virtual machine configuration and a second stream operator having a second virtual machine configuration. Aspects of the disclosure relate to the recognition that, in some situations, fusing stream operators having different virtual machine configurations may lead to irregular or unstable behavior. Accordingly, aspects of the disclosure relate to preventing an operator fusion action between stream operators having differing virtual machine configurations. Generally, preventing can include denying, rejecting, forbidding, avoiding, blocking, or otherwise disallowing fusion between the first stream operator having the first virtual machine configuration and the second stream operator having the second virtual machine configuration. The first and second virtual machine configurations may include arrangements of the settings, software versions, system parameters, resource allocations, and other properties of one or more virtual machines associated with the plurality of stream operators (e.g., virtual machines that host the stream computing environment having the plurality of stream operators). For instance, the first and second virtual machine management configurations may include a group of Java JVM (trademark of The Oracle Corporation) parameter settings for the first and second stream operators. In embodiments, preventing the operator fusion action may include determining that the first and second stream operator have different settings for virtual machine management software, and subsequently blocking fusion between the first and second stream operators. As an example, in response to detecting that a first stream operator has a first Java JVM setting and the second stream operator has a second Java JVM setting different than the first, fusion between the first and second stream operators may be disallowed. Other methods of preventing a fusion operation action are also possible.

In embodiments, fusing and preventing may occur at module 1142. The first group of stream operators may be fused with respect to a first group of stream operators that has a first set of computing capabilities which are identical. An operator fusion action may be prevented with respect to a second group of stream operators that has a second set of computing capabilities which are non-identical. Aspects of the disclosure relate to the recognition that in some situations, fusing stream operators having similar computing capabilities may be associated with positive impacts with respect to stream computing performance, and fusing stream operators having different computing capabilities may adversely impact stream computing performance (e.g., lead to irregular/unstable behavior). The first and second set of computing capabilities may include a collection of the properties and characteristics that define the computing performance of the first and second groups of stream operators. For instance, the first and second set of computing capabilities may include indications of the system resources (e.g., processor, memory, storage), tuple throughput rates (e.g., 400 tuples per second), historical usage results, and the like. Generally, fusing can include combining, merging, linking, coupling, pairing, or otherwise joining the first group of stream operators that has the first set of identical computing capabilities. In embodiments, fusing may include examining the first set of computing capabilities for each stream operator of the first group, determining that the computing capability for each stream operator achieves a similarity threshold with respect to each other stream operator of the first group, and subsequently fusing the first group of stream operators into one or more processing units. As an example, in response to determining that each stream operator of the first group has a tuple throughput rate of 250 tuples per second, the first group of stream operators may be fused into a processing element. In embodiments, a second group of stream operators having a second set of non-identical computing capabilities may be prevented (denied, rejected, forbidden, blocked, disallowed) from fusing. For instance, the second set of computing capabilities for each stream operator of the second group may be compared, and fusion may be prevented in response to ascertaining that the computing capabilities of each stream operator of the group do not achieve a similarity threshold (e.g., are not identical). For instance, in response to determining that a first stream operator of the second group uses 4 megabytes of memory and a second stream operator of the second group uses 8 megabytes of memory, an operator fusion action may be prevented with respect to the second group. Other methods of managing fusion based on the computing capabilities of groups of stream operators are also possible.

In embodiments, preventing and authorizing may occur at module 1143. An automated operator fusion action may be prevented by the operator fusion management engine with respect to the plurality of stream operators. A manual operator fusion action may be authorized by the operator fusion management engine. Aspects of the disclosure relate to the recognition that in some situations, particular groups of stream operators may be designated for fusion based on user input, and not be allowed to be fused by automatic techniques. Accordingly, aspects of the disclosure relate to preventing an automated operator fusion action, and authorizing a manual operator fusion action. Generally, preventing can include denying, rejecting, forbidding, avoiding, blocking, or otherwise disallowing the automated operator fusion action. The automated operator fusion action may include a fusion action between one or more stream operators that is initiated by computerized (e.g. automated) techniques without user input. As an example, the automated operator fusion action may include a heuristic-based method of stream operator management. In embodiments, preventing the automated operator fusion action may include marking one or more stream operators or processing elements as exempt from heuristic-based fusion determinations. In embodiments, a manual operator fusion action may be authorized (e.g., allowed, approved, granted, permitted). The manual operator fusion action may include a fusion action between one or more stream operators that is initiated based on input of a user (e.g., administrator, developer). Authorizing the manual operator fusion action may include prompting a user to define instructions or guidelines for how to manage a group of stream operators. For instance, the manual operator fusion action may include a set of instructions that defines that two stream operators A and B be fused together into a processing element (e.g., and not fused into subsequent processing elements). Other methods of preventing and authorizing operator fusion actions are also possible.

In embodiments, fusing and preventing may occur at module 1144. The first and second groups of stream operators may be fused with respect to a first group of stream operators of a first channel of a first region and a second group of stream operators of a second channel of a second region. Aspects of the disclosure relate to the recognition that, in some situations, it may be desirable to only allow fusion between stream operators located in the same channel of the same region. Generally, fusing can include combining, merging, linking, coupling, pairing, or otherwise joining a first group of stream operators of the same parallel channel. In embodiments, fusing may include comparing a channel parameter setting of each stream operator, and only authorizing fusions between stream operators that have the same channel parameter setting. As an example, the channel parameter setting of stream operators A, B, C, D, and E of the first group of stream operators may be identified, and it may be ascertained that stream operators A, C, and E have a channel parameter setting of "Region 6 Channel 3." Accordingly, stream operators A, C, and E may be fused into a processing element. In embodiments, an operator fusion action may be prevented with respect to the first group of stream operators of the first channel of the first region and a third group of stream operators of a third channel of the first region. Generally, preventing can include denying, rejecting, forbidding, avoiding, blocking, or otherwise disallowing the operator fusion action with respect to the second group of stream operators of different parallel channels. In embodiments, preventing may include comparing a channel parameter setting of each stream operator, and blocking fusions between stream operators that have different channel parameter settings. As an example, the channel parameter setting of stream operators A, B, C, D and E of the second group of stream operators may be identified, and it may be ascertained that stream operators A, C and E have a channel parameter setting of "Region 6 Channel 3," and stream operators B and D have a channel parameter setting of "Region 6 Channel 9." Accordingly, fusions between stream operators associated with different channel parameter settings (e.g., A and B, A and D, C and B, C and D, E and B, E and D) may be prevented. Other methods of managing an operator fusion action are also possible.

In embodiments, fusing and preventing may occur at module 1145. Aspects of the disclosure relate to the recognition that, in some embodiments, it may be desirable to allow fusion operations with respect to stream operators of other channels, provided they are not located in the same region as one another. In embodiments, fusing may be performed with respect to a first group of stream operators of a first channel of a first region and a second group of stream operators of a second channel of a second region. Generally, fusing can include combining, merging, linking, coupling, pairing, or otherwise joining a first group of stream operators of a first channel of a first region and a second group of stream operators of a second channel of a second region. In embodiments, fusing may include identifying the region and channel parameter settings of each stream operator of the first and second groups of stream operators, and authorizing fusions between stream operators that have different region parameter settings. As an example, a first stream operator of the first group of stream operators having a region and channel parameter setting of "Region 12 Channel 9" may be fused with a second stream operator of the second group of stream operators having a region and channel parameter setting of "Region 3 Channel 8." In embodiments, preventing may be performed with respect to a first group of stream operators of the first channel of the first region and a third group of stream operators of a third channel of the first region. Generally, preventing can include denying, rejecting, forbidding, avoiding, blocking, or otherwise disallowing an operator fusion action with respect to the first group of stream operators of the first channel of the first region and a third group of stream operators of a third channel of the first region. In embodiments, preventing may include identifying the region and channel parameter settings of each stream operator of the first and third groups of stream operators, and blocking fusions between stream operators that have the same region parameter settings. As an example, a first stream operator of the first group of stream operators having a region and channel parameter setting of "Region 2 Channel 6" may be prevented from fusion with a third stream operator of a third group having a region and channel parameter setting of "Region 2 Channel 10." Other methods of managing an operator fusion action are also possible.

In embodiments, a debug notification may be provided at module 1146. The debug notification may be provided by the operator fusion management engine. The debug notification may indicate a fusion activity event. Generally, providing can include displaying, conveying, relaying, or otherwise presenting the debug notification. The debug notification may include an announcement, notice, warning, or other communication of an error, bug, failure, or other irregularity with respect to an operator fusion activity event. For instance, the debug notification may include an indication that one or more operators has violated a fusion constraint. In embodiments, providing may include generating and displaying a dialogue box having a message that indicates the nature of the error (e.g., type, cause). In embodiments, the message may be formatted to indicate a list of target operators (e.g., which set of operators were attempted to be fused), a constraint violation description (e.g., not all operators have the same value for an attribute), an operator information message that contains relevant description and attribute information for each operator, and the like. In embodiments, the message may be provided with respect to a collection of operators (e.g., rather than to pair-wise compared operators), and violations for multiple operator attributes can be contained in the same message structure. The following illustrates an example debug notification:

SummaryMsg—Operators {op1, op2, op3, op4) are not able to be fused together.

ErrMsg1—These operators are not able to be fused together because they do not have the same value for "restartable".

ErrMsg2—These operators are not able to be fused together because they do not all have the same value for the {"Java_JVM_Args" } location.

InfoMsg1—op1 is restartable, and has {"Java_JVM_Args"} location specified with {"MaxMem= 256 k" } value.

InfoMsg1—op2 is restartable, and has {"Java_JVM_Args"} location specified with {"MaxMem= 128 k"} value.

InfoMsg1—op3 is NOT restartable, and has {"Java_JVM_Args"} location specified with {"MaxMem= 128 k"} value.

InfoMsg1—op4 is restartable and has no locations specified.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for operator fusion management in a stream computing environment having a plurality of stream operators, the method comprising:
   collecting, by an operator fusion management engine in a stream computing environment a set of operator attributes of a plurality of stream operators, the collecting includes an aggregation and an analysis of historical usage data for the plurality of stream operators, the operator fusion management engine including a configuration for examining the plurality of stream operators in the stream computing environment, the set of operator attributes being selected from the group consisting of: a setting, a parameter, a computing capability, and a region identifier, wherein the set of operator attributes indicates the performance characteristics of one or more of the plurality of stream operators;

determining, by the operator fusion management engine based on the set of operator attributes, a set of candidate operator fusion management operations with respect to the plurality of stream operators;

regulating, using a software module of the operator fusion management engine, fusion between the one or more of the plurality of stream operators, and providing a debug notification, using the operator fusion management engine, the debug notification indicating a fusion activity event; and performing, in the stream computing environment with respect to the plurality of stream operators, at least one of the set of candidate operator fusion management operations, the at least one of the set of candidate operator fusion management operations being calculated dynamically in response to detecting the set of operator attributes, and the performing of at least one of the set of candidate operator fusion management operations is initiated automatically without user intervention; wherein the fusing, with respect to a first group of stream operators that has a first set of computing capabilities which are identical, the first group of stream operators; and preventing, with respect to a second group of stream operators that has a second set of computing capabilities which are non-identical, an operator fusion action.

* * * * *